United States Patent
Kim

(10) Patent No.: US 6,484,017 B1
(45) Date of Patent: Nov. 19, 2002

(54) UP CONVERTER OF BASE STATION TRANSMITTER IN WIRELESS COMMUNICATION SYSTEM AND METHOD OF CONTROLLING OUTPUTS THEREOF

(75) Inventor: Sung Min Kim, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/390,668

(22) Filed: Sep. 7, 1999

(30) Foreign Application Priority Data

Sep. 7, 1998 (KR) ............................................. 98/16966
Dec. 14, 1998 (KR) ............................................. 98/25715

(51) Int. Cl.$^7$ ................................................. H04B 1/04
(52) U.S. Cl. ........................ 455/126; 455/115; 330/280
(58) Field of Search ................................. 455/126, 127, 455/115, 561; 330/130, 138, 279, 280

(56) References Cited

U.S. PATENT DOCUMENTS

| | | | |
|---|---|---|---|
| 5,023,937 A | * 6/1991 | Opas | 455/126 |
| 5,107,225 A | 4/1992 | Wheatley, III et al. | 330/279 |
| 5,337,006 A | 8/1994 | Miyazaki | 330/130 |
| 5,396,652 A | 3/1995 | Kunitomo | 455/75 |
| 5,659,893 A | 8/1997 | Enoki et al. | 455/126 |
| 6,070,058 A | * 5/2000 | Waldroup et al. | 455/126 |

* cited by examiner

Primary Examiner—Lee Nguyen
(74) Attorney, Agent, or Firm—Fleshner & Kim, LLP

(57) ABSTRACT

Disclosed an up converter of base station transmitter of an wireless communication and method of controlling outputs of the up converter to control output signals of the up converter in accordance with the conditions of the strength of input signal and/or output signal of by detecting the input signal level and/or output signal level of the up converter. The up converter of the present invention comprises an input level detection section for detecting an input signal of the up converter; a variable attenuator for attenuating converted frequency in the up converter; an output level detection section for detecting an output signal of the up converter; a processor for outputting a control signal to adjust the variable attenuator in accordance with the detected results of the input level detection section and the output level detection section.

22 Claims, 5 Drawing Sheets

UP CONVERTER OF BASE STATION TRANSMITTER IN WIRELESS COMMUNICATION SYSTEM AND METHOD OF CONTROLLING OUTPUTS THEREOF

CROSS REFERENCE TO RELATED APPLICATION

This application claims priority from Korean Patent Application Nos. U98-16966, filed on Sep. 7, 1998 and U98-25715, filed on Dec. 14, 1998, which are hereby incorporated by references in their entirety.

BACKGROUND OF THE INVENTION

1. Field of the Invention

This invention relates to an up converter of a base station transmitter of an wireless communication system and more particularly to an up converter of base station transmitter of an wireless communication and method of controlling outputs of the up converter to maintain stabilized outputs, matching the wireless communication system in accordance with improving a structure of the up converter.

2. Description of the Prior Art

An up converter is a communication device for converting a lower frequency signal into a higher frequency signal, and has been used to convert a intermediate frequency modulated from a low frequency into a higher frequency to transmit in a long distance at a video and audio transmitter for a TV broadcasting system or an wireless communication system. Generally, the video signal for TV broadcasting system is converted to VHF or UHF signal and the audio signal is converted into a higher frequency, matching bandwidths of communication manner, i.e. from about 64 Mhz to 1.2 GHz.

FIG. 1 is a block diagram illustrating an up converter of a base station transmitter in mobile communication system based on Code Division Multiple Access Type. The up converter of a base station transmitter shown in FIG. 1 is general type, and has been applied to general base station transmitter.

With reference to FIG. 1, an analog signal output from a baseband processing circuit of a base station transmitter is inputted to an attenuator 11 and attenuated the input signal at predetermined power level. Both an output signal of the attenuator 11 and a single frequency provided from a local oscillator 19, are inputted to a mixer 12 to mix each other. Thus, first of all, frequency of the input signal of the up converter is up converted in the stage.

Subsequently, an output signal of the mixer 12 is inputted to a band pass filter 13 and filtered to pass only a predetermined frequency bandwidth. An output signal of the band pass filter 13 is inputted to an amplifier 14 and amplified with a predetermined amplification ratio. Both an output signal of the amplifier 14 and a single frequency generated from a local oscillator 20 up/down convert an input frequency, are inputted to a mixer 15 to mix each other. Thus, the frequency of the input signal, which is already converted, is up converted in the stage.

Next, an output signal of the mixer 15 is inputted to a band pass filter 16 and filtered to pass only a predetermined frequency bandwidth. An output signal of the band pass filter 16 is inputted to a variable attenuator 17 and adjusted with the output signal level of the band pass filter 16 by the operation of a processor 21. At this event, a adjustment voltage of the variable attenuator 17 is setup in initial stage of applying the up converter to adjust the output signal of the attenuator 17. And an output signal of the variable attenuator 17 is inputted to an amplifier 18 and amplified with a predetermined amplification ratio, and transmitted to outward through a power amplifier and an antenna which are not shown in FIG. 1.

As described above, there was problems that the input signal of the up converter is directly inputted to the first mixer 33 and the output signal of the variable attenuator is directly transmitted to the outward through the second amplifier in the related art of up converter. Accordingly, if the radio signal transmitted form the up converter is not reached completely to a corresponding base station's area, a managing station of the mobile communication system could not find exact causes that the problem is caused by no applying the input signal to the up converter or working at out of order in the related up converter. The manager of the mobile communication system have to check each state of a lots of base station transmitters including an up converter in order to repair in the circumstance.

SUMMARY OF THE INVENTION

Therefore, an object of the present invention is to solve the disadvantage involved in the related art, and to provide an up converter of base station transmitter of an wireless communication and method of controlling outputs of the up converter to control output signals of the up converter in accordance with the strength of the input signal level and output signal level of the up converter.

Also, it is the other object to provide to an up converter of base station transmitter of an wireless communication and method of controlling outputs of the up converter to minimize the variation of output signals of the up converter caused of characteristics and temperature of elements equipped in the up converter or the variation of communication circumstance by improving the structure of the up converter.

In order to achieve the above object, there is provided to an up converter of a base station transmitter in an wireless communication system, the up converter comprises an input level detection section for detecting an input signal of the up converter; a variable attenuator for attenuating converted frequency in the up converter; an output level detection section for detecting an output signal of the up converter; a processor for outputting a control signal to adjust the variable attenuator in accordance with the detected results of the input level detection section and the output level detection section.

In order to achieve the other object, there is provided to an up converter of a base station transmitter in an wireless communication system, the up converter comprises an input level detection section for detecting an input signal of the up converter; a first variable attenuator for attenuating converted frequency in the up converter by a first control voltage; a second variable attenuator for attenuating converted frequency outputted from the first variable attenuator; a processor for providing a second voltage to the second variable attenuator in order to adjust a strength of the output of the first attenuator; an output level detection section for detecting an output signal of the up converter; an automatic gain controller for outputting the first control voltage to adjust the first variable attenuator in accordance with the detected results of the input level detection section and the output level detection section, and the second voltage provided from the processor.

BRIEF DESCRIPTION OF THE DRAWINGS

The above object and other features of the present invention will become more apparent by describing the preferred embodiments thereof with reference to the accompanying drawings, in which.

DETAILED DESCRIPTION OF THE PREFERRED EMBODIMENT

Now, the preferred embodiments of the present invention configured as above are explained in detail in connection with attached drawings.

First Embodiment of the Present Invention

Figure 1:
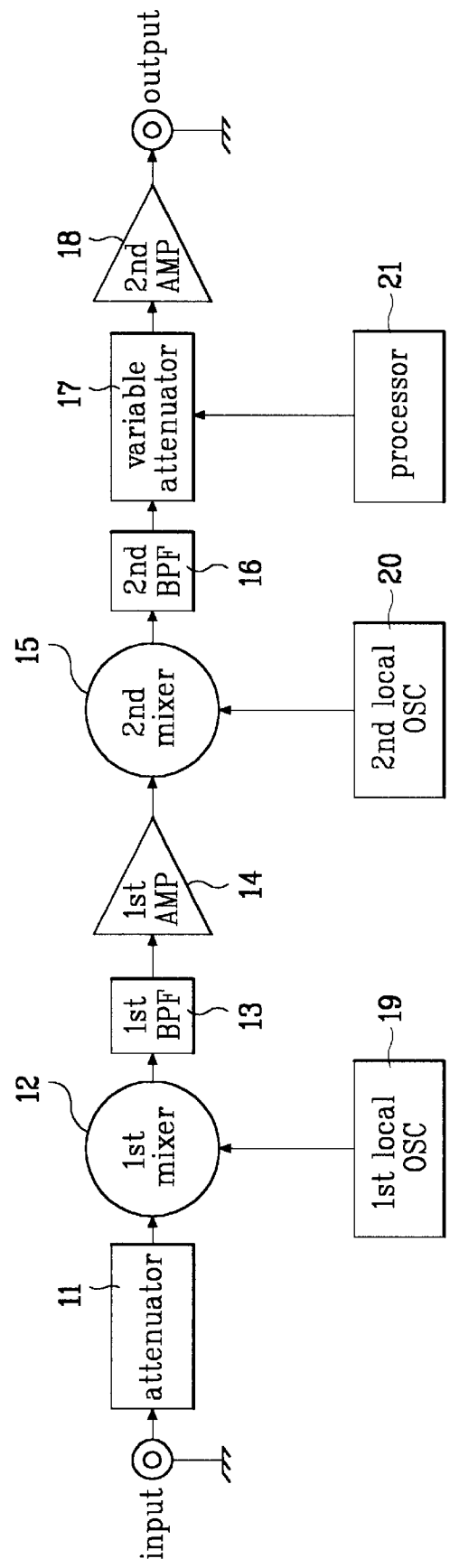
FIG. 1 is a block diagram illustrating an up converter of a base station transmitter in mobile communication system based on Code Division Multiple Access Type.

FIG. 1 is a block diagram illustrating an up converter of a base station transmitter in mobile communication system based on Code Division Multiple Access Type. With reference with FIG. 1, the up converter of the first embodiment of the present invention comprises an attenuator 31 for receiving an input signal outputted from a baseband treatment section of a base station transmitter and attenuating a power of the input signal, a first directional coupler 32a for receiving and branching an output signal of the attenuator 31, a first local oscillator 43a for generating a single frequency to up/down convert a frequency band, a first mixer 33 for receiving and mixing output signals of the first directional coupler 32a and the first local oscillator 43a, a first band pass filter 34 for receiving an output signal of the first mixer 33 and filtering to pass a predetermined frequency band, a first amplifier 35 for receiving an output signal of the first band pass filter 34 and amplifying with a predetermined amplification ratio, a second local oscillator 43b for generating a single frequency to up/down convert a frequency band, a second mixer 36 for receiving and mixing output signals of the second local oscillator 43b and the first amplifier 35, a second band pass filter 37 for receiving an output signal of the second mixer 36 and filtering to pass a predetermined frequency band, a variable attenuator 38 for receiving an output signal of the second band pass filter 37 and adjusting with variable a power of the inputted signal, a second amplifier 39 for receiving an output signal of the variable attenuator 38 and amplifying with a predetermined amplification ratio, a second directional coupler 40 for receiving and branching an output signal of the second amplifier 39, an input level detection section 42a for detecting a power level of the first directional coupler 32a, an output level detection section 42b for detecting a power level of the second directional coupler 40, a processor 41 for controlling the variable attenuator 38 in accordance with the detected values of the input level detection section 42a and the output level detection section 42b. Further, a power amplifier for finally amplifying the output signal of the up converter and an antenna may be coupled to the second directional coupler 40.

Also, the processor 41 controls the output frequencies of the first and second oscillators 43a and 43b to perform the frequency conversion, and detects a power source state and input/output state of the corresponding circuit boards equipped with the up converter to report to a higher processor.

Figure 3A:
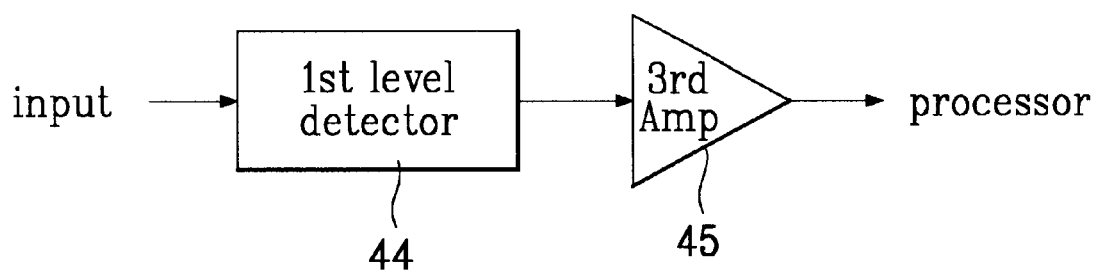
FIGS. 3A and 3B are block of an input level detection part and output level detection part shown in FIG. 2, respectively.
Figure 3B:
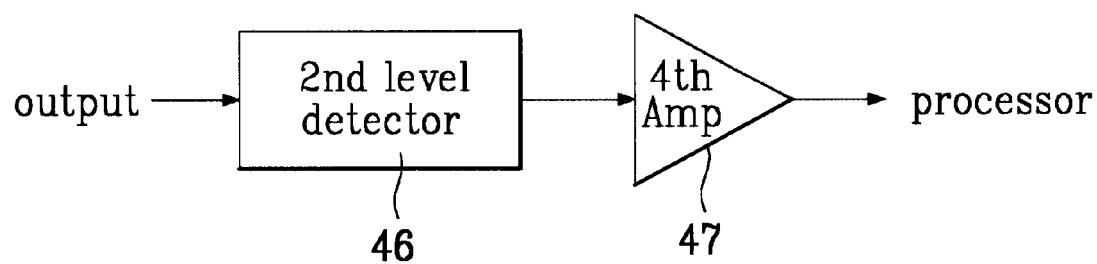

Here, the input level detection section 42a includes a first level detector 44 for detecting the output signal of the first directional coupler 32a and outputs analog voltage corresponding to the detected signal, and a third amplifier 45 for amplifying the output signal of the a first level detector 44 as shown in FIG. 3A. Also, the output level detection section 42b includes a second level detector 46 for detecting the output signal of the the second directional coupler 40 and outputs analog voltage corresponding to the detected signal, and a forth amplifier 47 for amplifying the output signal of the a first level detector 46 as shown in FIG. 3B.

Figure 2:
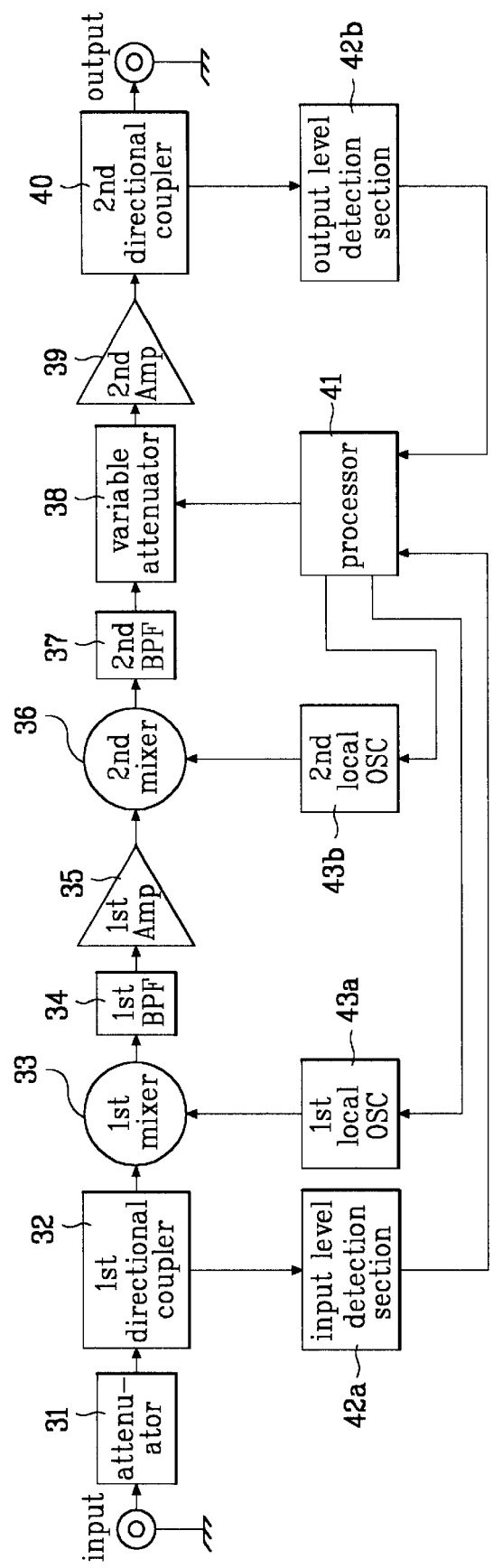
FIG. 2 is a block diagram illustrating an up converter of a base station transmitter in mobile communication system according to a first embodiment of the present invention.

The operation of the up converter of the first embodiment according to the present invention will be explained with reference with attached figures of FIGS. 2 and 3.

The attenuator 31 receives the input signal outputted from the baseband treatment section of the base station transmitter (not shown) and attenuate the power of the input signal. The first directional coupler 32a receives the output signal of the attenuator 31 and branches out into two signals. Thus, a main signal of the attenuator 31 is applied to the first mixer 33 and the branched signal is applied to the input level detection section 42a. In the input level detection section 42a, since the first level detector 44 has a management table listed analog voltages corresponding to strength of the input signal, and can output the corresponding voltage signal. For example, the more the input signal strength is reduced to a minimum strength of the first level detector 44, the more the output voltage is reduced to minimum voltage in proportion to the strength of the first level detector 44. So, the input level detection section 42a detects the power level of the first directional coupler 32a and forwards the detected result to the processor 41.

The processor 41 has reference values corresponding to the strength of the output signal of the input level detection section 42a and can decide whether the input signal provided from the input level detection section 42a is inputted in normal state or not. At this event, the processor 41 compares the input signal level with the reference value and decides the input signal under the condition of the lowest level of the input signal.

Meanwhile, the first local oscillator 43a generates the single frequency to perform up/down conversion the inputted frequency band. Accordingly, the first mixer 33 mixes output signals of the first directional coupler 32a and the first local oscillator 43a to perform the first frequency conversion. Next, the first band pass filter 34 filters the output signal of the first mixer 33 to pass a predetermined frequency band. The first amplifier 35 amplifies the output signal of the first band pass filter 34 with a predetermined amplification ratio.

Meanwhile, the second local oscillator 43b also generates the single frequency to perform the up/down conversion the inputted frequency band. Accordingly, the second mixer 36 mixes output signals of the second local oscillator 43b and the first amplifier 35 to perform the second frequency conversion which is higher than the first frequency. The second band pass filter 37 filters the output signal of the second mixer 36 to pass the predetermined frequency band. Next, the variable attenuator 38 attenuate the output signal of the second band pass filter 37 to adjust the power of the inputted signal by the control signal of the processor 41. The second amplifier 39 amplifies the output signal of the variable attenuator 38 with the predetermined amplification ratio. The second directional coupler 40 branches the output signal of the second amplifier 39. Thus, the main signal of the second amplifier 39 is applied to the power amplifier(not shown) and the branched signal is applied to the output level detection section 42b. In the output level detection section 42b, since the second level detector 46 has a management table listed analog voltages corresponding to strength of the output signal of the second directional coupler 40, and can output the corresponding voltage signal. So, the output level detection section 42b detects the power level of the second directional coupler 40 and forwards the detected result to the processor 41.

The processor 41 has reference values corresponding to the strength of the output signal of the output level detection section 42b and can decide whether the output signal provided from the output level detection section 42b is inputted in normal state or not. At this event, the processor 41 compares the output signal level with the reference value and decides the output signal under the condition of the lowest level of the output signal.

The processor 41 provides the control signal to the variable attenuator 38 in accordance with detected values of the input level detection section 42a and the output level detection section 42b.

For example, if the detected strength from the input level detection section 42a is less than to the reference value stored in the processor 41, the processor 41 recognizes the present state and reports the information to a higher processor that the up converter operates on normal state regardless of the output signal of the output level detection section 42b. While, if the signal outputted from the input level detection section 42a is inputted on normal state and the signal outputted from the output level detection section 42b is less than to the reference value stored in the processor 41, the processor 41 recognizes the present state and reports the information to a higher processor that the up converter operates on abnormal state, as well as controls the variable attenuator 38 to adjust the output signal which is more stabilized.

Also, the processor 41 judges the number of total user in specific base station area by increasing amount for signal level of the input level detection section 43a, since the input signals of the up converter increases according to the number of users.

Accordingly, if the mobile station in specific base station area, on which the up converter is equipped, has gone wrong in operation, it is easy to know what the up converter or the other communication devices operates in normal or obnormal state in accordance with the strength of the input and output signal of the up converter and thereby performing with easy maintaining or repairing process to the base station transmitter.

But, in the first embodiment of the present invention, the variable attenuator is controlled by in the manner that the output voltages of input and output level detection sections is red by an analog/digital process and a digital/analog process. Thus, if the compensation operation is performed according to variation of the input or output level of the up converter, time delay maybe occur thereof, and the output of the up converter could not compensated rapidly.

Also, if the processor periodically performs the control operation for the variable attenuator by comparing the detected results of the input and output level detection section with the reference value stored in the up converter, heavy burden is loaded to the processor, and thereby providing causes to perform in a hard other functions given to the processor.

Accordingly, an improved up converter is suggested in the second embodiment according to the present invention.

Second Embodiment of the Present Invention

Figure 4:
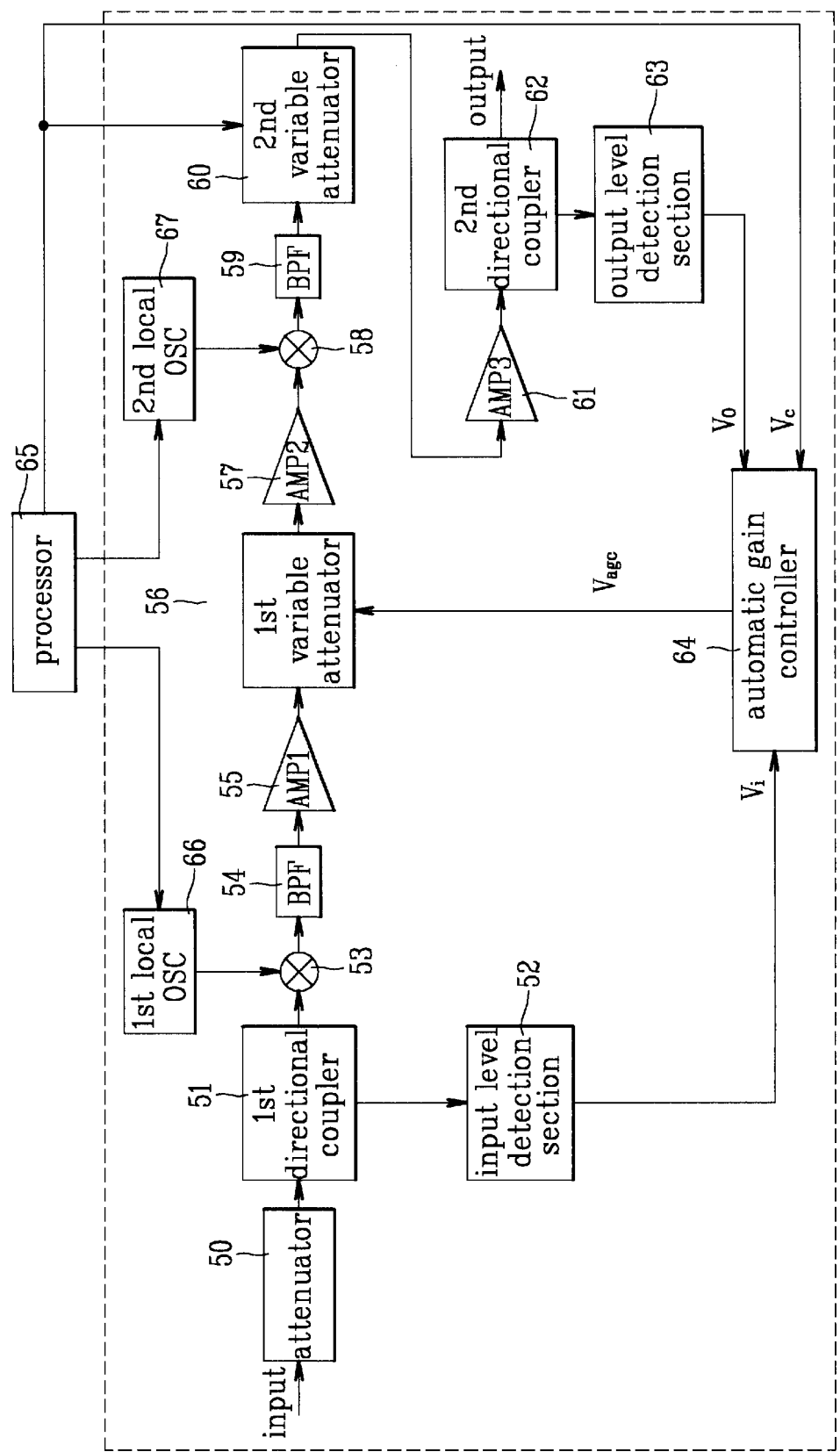
FIG. 4 is a block diagram illustrating an up converter of a base station transmitter in mobile communication system according to a second embodiment of the present invention.

FIG. 4 is a block diagram illustrating an up converter of a base station transmitter in mobile communication system according to a second embodiment of the present invention. With reference with FIG. 4, the up converter of the second embodiment of the present invention comprises an attenuator 50 for receiving an input signal outputted from a baseband treatment section of a base station transmitter and attenuating a power of the input signal, a first directional coupler 51 for receiving and branching an output signal of the attenuator 50, a first local oscillator 66 for generating a single frequency to up/down convert a frequency band, a first mixer 53 for receiving and mixing output signals of the first directional coupler 51 and the first local oscillator 66, a first band pass filter 54 for receiving an output signal of the first mixer 53 and filtering to pass a predetermined frequency band, a first amplifier 55 for receiving an output signal of the first band pass filter 54 and amplifying with a predetermined amplification ratio, a first variable attenuator 56 for receiving an output signal of the first amplifier 55 and adjusting with variable a power of the inputted signal, a second amplifier 57 for receiving an output signal of the first variable attenuator 56 and amplifying with a predetermined amplification ratio, a second local oscillator 67 for generating a single frequency to up/down convert a frequency band, a second mixer 58 for receiving and mixing output signals of the second local oscillator 67 and the second amplifier 57, a second band pass filter 59 for receiving an output signal of the second mixer 58 and filtering to pass a predetermined frequency band, a second variable attenuator 60 for receiving an output signal of the second band pass filter 59 and adjusting with variable a power of the inputted signal, a third amplifier 61 for receiving an output signal of the second variable attenuator 60 and amplifying with a predetermined amplification ratio, a second directional coupler 62 for receiving and branching an output signal of the third amplifier 61, an input level detection section 52 for detecting a power level of the first directional coupler 51, an output level detection section 63 for detecting a power level of the second directional coupler 62, a processor 65 for controlling a power level of output signal of the second variable attenuator 60, and an automatic gain controller 64 for controlling the first variable attenuator 56 in accordance with the detected values of the input level detection section 52 and the output level detection section 63 and the control signal of the processor 65.

Figure 5:
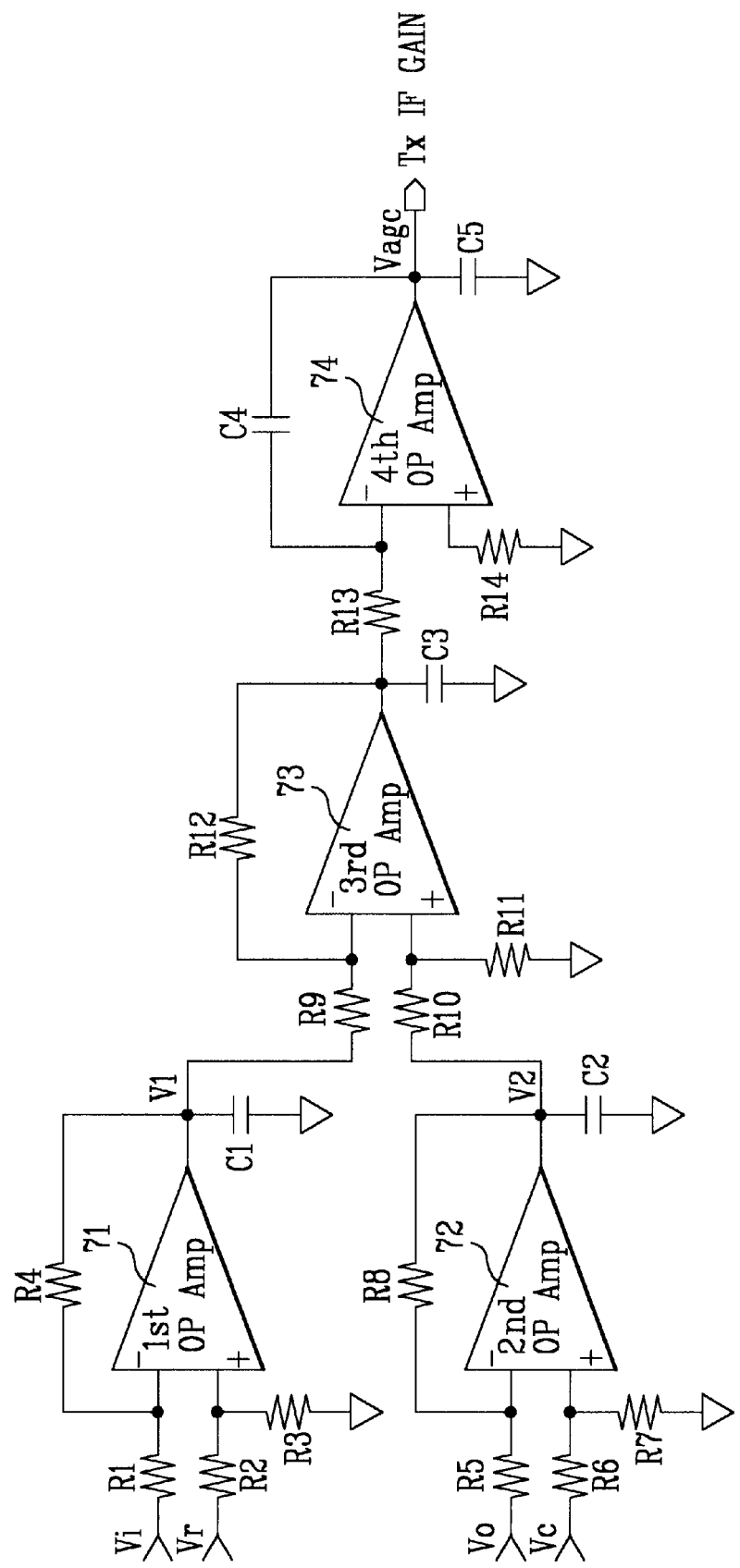
FIG. 5 is a circuit diagram of an automatic gain controller shown in FIG. 4.

Here, the automatic gain controller 64, as shown in FIG. 5, includes a first comparator 71 for comparing an input voltage Vi which is outputted from the input level detection section 52 and inputted to inversion terminal of the first comparator 71 with a predetermined reference voltage signal which is inputted to non-inversion terminal of the first comparator 71, a second comparator 72 comparing an output voltage Vo which is outputted from the second level detection section 63 and inputted to inversion terminal of the second comparator 72 with a control voltage Vc which is outputted from the processor 65 and inputted to non-inversion terminal of the second comparator 72, a third comparator 73 for the output signal of the first comparator 71 which is inputted to the inversion terminal of the third comparator 73 with the output signal of the second comparator 72 which is inputted to the non-inversion terminal of the third comparator 73, and an integrator 74 for operating integral control action the output signal of the third comparator 73.

The first comparator 71 compares the output voltage Vi outputted from the input level detection section 52 with the predetermined reference voltage Vr which is determined to match the characteristics of communication system corresponding to the output voltage Vi.

The second comparator 72 compares the control voltage (TX RF Gain:Vc) of the second variable attenuator 56 which is controlled by the processor 65 with the output voltage Vo of the output level detection section 63. Thus, stabilized level for the output signal of the up converter is decided by the operation of the second comparator 72, and the output level variation caused by variation of characteristics and temperature of the up converter's elements, and communication circumstances is compared with the control voltage Vc, and thus compensated as much as the varied voltage.

So, the third comparator 73 compares the output signals of the first comparator 71 and the second comparator 72 and judges whether the output variation is caused by input variation or variation of characteristics and temperature of the up converter's elements, and communication circumstances. For example, the third comparator 73 maintains the control voltage of the first variable attenuator 56 without adjustment, when the variation of the input and output signal levels are equivalent to each other. While, if the output variation is more higher or lower than to the input variation, the third comparator 73 controls the control voltage of the first variable attenuator 56 as much as the difference of the two amount.

The integrator 74 of FIG. 5 is used to maintain with constant the output level of the third comparator 73.

The operation of compensating the output signal of the up converter of the second embodiment according to the present invention will be explained in case that the characteristic variation of the up converter's elements is not exist.

First, the input level variation is proportional to the output level variation with equal condition, if the characteristic variation of the elements equipped in the up converter is not exist. So, if the variation is defined to 'Δ1', the voltage Vi of the input level detection section 52 will be obtained by using following equation 1.

$$Vi(\text{Output Voltage}) = Vi_{(initial)} + \Delta 1 \qquad \text{equation 1}$$

Whereby, $Vi_{(initial)}$ means an initial voltage in case that of no varying the input level.

Also, the voltage Vo of the output level detection section 63 is obtained by using following equation 2.

$$Vo = Vc + 1 \qquad \text{equation 2}$$

So, the output voltage V1 of the first comparator 71 of the automatic gain controller 64 is obtained by applying the voltage Vi of the input level detection section 52 onto the following equation 3.

$$V_1 = -Vi + Vr = -(Vi - Vr) = Vr - Vi_{(initial)} - \Delta 1 \qquad \text{equation 3}$$

Also, the output voltage V2 of the second comparator 72 of the automatic gain controller 64 is obtained by applying the voltage Vo of the output level detection section 60 onto the following equation 4.

$$V_2 = -Vo + Vc = -(Vo - Vc) = -\Delta 1 \qquad \text{equation 4}$$

So, the output voltage V3 of the third comparator 73 of the automatic gain controller 64 is obtained from the difference between the output voltage V1 and the output voltage V2 which is also obtained by using the following equation 5.

$$V_3 = -V_1 + V_2 = -(Vr - Vi_{(initial)} - \Delta 1) + (-\Delta 1) = -Vr + Vi_{(initial)} + \Delta 1 - \Delta 1 = Vi_{(initial)} - Vr = V_{age} \qquad \text{equation 5}$$

The output voltage of the third comparator 73 produced as explained the above is inputted to the integrator 74 to control the first variable attenuator 56.

While, the operation of compensating the output signal of the up converter will be explained in case that the characteristic variation of the up converter's elements is exist.

First, if the input level variation is defined to 'Δi' and the output level variation is defined to 'Δo', the voltage Vi of the input level detection section 52 will be obtained by using following equation 6.

$$Vi = Vi_{(initial)} + \Delta i \qquad \text{equation 6}$$

Whereby, $Vi_{(initial)}$ means an initial voltage in case that of varying the input level.

Also, the voltage Vo of the output level detection section 63 is obtained by using following equation 7.

$$Vo = Vc + \Delta o \qquad \text{equation 7}$$

So, the output voltage V1 of the first comparator 71 of the automatic gain controller 64 is obtained by applying the voltage Vi of the input level detection section 52 onto the following equation 8.

$$Vi = -Vi + Vr = Vr - Vi = Vr - (Vi_{(initial)} + \Delta i) = Vr - Vi_{(initial)} - \Delta i \qquad \text{equation 8}$$

Also, the output voltage V2 of the second comparator 72 of the automatic gain controller 64 is obtained by applying the voltage Vo of the output level detection section 60 onto the following equation 9.

$$V_2 = -Vo + Vc = -(Vc + \Delta o) + Vc - \Delta o \qquad \text{equation 9}$$

So, the output voltage V3 of the third comparator 73 of the automatic gain controller 64 is obtained from the difference between the output voltage V1 and the output voltage V2 which is also obtained by using the following equation 10.

$$V_3 = -V_1 + V_2 = -(Vr - Vi_{(initial)} - \Delta i) + (-\Delta o) = -Vr + Vi_{(initial)} + \Delta i - \Delta o = Vi_{(initial)} - Vr - (\Delta o - \Delta i) = V_{age} + (\Delta i - \Delta o) \qquad \text{equation 10}$$

Accordingly, the control voltage of the first variable attenuator 56 is varied by the voltage obtained from the equation 10, and thus the output level variation of the up converter, which are caused by varying characteristic, temperature of the elements equipped in the up converter, and communication circumstance, is compensated in proper manner according to the present invention.

For example, if the gain value of the up converter is reduced than the reference value stored in the up converter, the variation (Δo) for the output signal is lower than the variation (Δi) for the input signal, and thus the difference (Δi−Δo) may be higher than "0". Thus, the control voltage for the first variable attenuator 56 is increased than the voltage which will be just fedback to the automatic gain control loop, thereby reducing the attenuation amount to the first variable attenuator 56 by the operation of automatic gain controller 64.

While, if the gain value of the up converter is increased than the reference value stored in the up converter, the variation (Δo) for the output signal is higher than the variation (Δi) for the input signal, and thus the difference (Δi−Δo) may be lower than "0". Thus, the control voltage for the first variable attenuator 56 is reduced than the voltage which will be just fedback to the automatic gain control loop, thereby increasing the attenuation amount to the first variable attenuator 56 by the operation of automatic gain controller 64. That is, it has the characteristics that the attenuation amount of the first and the second variable attenuators 56 and 60 is not proportional to the the control voltages.

According to the second embodiment of the present invention, it is provided to the up converter which can minimize the time delay and rapidly compensate the output variation of the up converter in stabilized state, since the automatic gain controller, which is included of only some comparators, is embodied.

Also, in case that the up converter of the present invention is operating in abnormal state, the manager of the base station will know with easy where have the problems that caused by the input variation for the input signal, or variation of characteristics and temperature to elements equipped in the up converter or the variation of communication circumstances.

Also, the processor loads are reduced does not like the first embodiment of the present invention, since the first variable attenuator is controlled by the automatic gain controller, which is added in second embodiment of the present invention, instead of the processor of the up converter. It means that the processor completely operates other functions to take part in controlling the variable attenuator.

Many modifications and variation of the present invention are possible in light of the above teachings such as a down converter or a converter for TV broadcasting. Therefore, it is to be understood that within the scope of the appended claims, the invention may be practiced otherwise than as specifically described.

What is claimed is:

1. An up converter of a transmitter in a wireless communication system, comprising:

an input level detection section for detecting an analog input signal of the up converter, converting the detected analog input signal to a detected digital input signal, matching the detected digital input signal to one of a plurality of reference input values, and outputting a first analog output signal corresponding to the one reference input value;

a variable attenuator for attenuating converted frequency in the up converter;

an output level detection section for detecting an analog output signal of the up converter, converting the detected analog output signal to a detected digital output signal, matching the detected digital output signal to one of a plurality of reference output values, and outputting a second analog output signal corresponding to the one reference output value; and a processor for outputting a control signal to adjust the variable attenuator in accordance with the first and second analog output signals.

2. The up converter as claimed in claim 1, wherein the up converter further comprises at least one directional coupler for branching an inputted signal is connected to both an input terminal and an output terminal of the up converter.

3. The up converter as claimed in claim 1, wherein the input level detection section or the output level detection section includes at least one level detector for outputting an analog voltage corresponding to the detected results.

4. The up converter as claimed in claim 1, wherein the processor stores reference values corresponding to output strengths of the input level detection section and the output level detection section.

5. The up converter as claimed in claim 1, wherein the processor estimate the number of users in a specific base station area by detecting increasing a signal level of the input level detection section.

6. An up converter of a base station transmitter in an wireless communication system, the up converter comprising:

an attenuator for attenuating an input signal of the up is converter;

a first directional coupler for branching an output signal of the attenuator;

a first local oscillator for generating a single frequency to convert a frequency band;

a first mixer for mixing output signals of the first directional coupler and the first local oscillator;

a first band pass filter for filtering an output signal of the first mixer to pass a predetermined frequency band;

a first amplifier for amplifying an output signal of the first band pass filter with a predetermined amplification ratio;

a second local oscillator for generating a single frequency to convert a frequency band;

a second mixer for mixing output signals of the second local oscillator and the first amplifier;

a second band pass filter for filtering an output signal of the second mixer to pass a predetermined frequency band;

a variable attenuator for attenuating an output signal of the second band pass filter;

a second amplifier for amplifying an output signal of the variable attenuator with a predetermined amplification ratio;

a second directional coupler for branching an output signal of the second amplifier;

an input level detection section for detecting a signal level of the first directional coupler;

an output level detection section for detecting a signal level of the second directional coupler; and a processor for controlling the variable attenuator in accordance with detected values of the input level detection section and the output level detection section.

7. A method of controlling an output signal of an up converter of a transmitter in a wireless communication system, the method comprising:

detecting an analog input signal of the up converter, converting the detected analog input signal to a detected digital input signal, matching the detected digital input signal to one of a plurality of reference input values, and outputting a first analog output signal corresponding to the one reference input value;

converting a frequency of the analog input signal with the up converter and attenuating the frequency converted analog input signal with an attenuator;

detecting an analog output signal of the up converter, converting the detected analog output signal to a detected digital output signal, matching the detected digital output signal to one of a plurality of reference output values, and outputting a second analog output signal corresponding to the one reference output value; and outputting a control signal to adjust the output level of the attenuator in accordance with the first and second analog output signals.

8. The method of controlling output signal of an up converter as claimed in claim 7, wherein adjustment to the output of the up converter is performed by at least one variable attenuator.

9. The method of controlling output signal of an up converter as claimed in claim 7, wherein if the detected output strength is less than to the reference value, the processor recognizes to a higher processor that the up converter operates on normal state regardless of the output signal of the up converter.

10. The method of controlling output signal of an up converter as claimed in claim 7, wherein if the input signal is inputted to the up converter on normal state and the output signal is less than to the reference value, the processor recognizes to a higher processor that the up converter operates on abnormal state and adjusts the control signal.

11. An up converter of a base station transmitter in an wireless communication system, the up converter comprising:
   an input level detection section for detecting an input signal of the up converter;
   a first variable attenuator for attenuating converted frequency in the up converter by a first control voltage;
   a second variable attenuator for attenuating converted frequency outputted from the first variable attenuator;
   a processor for providing a second voltage to the second variable attenuator in order to adjust a strength of the output of the first attenuator;
   an output level detection section for detecting an output signal of the up converter;
   an automatic gain controller for outputting the first control voltage to adjust the first variable attenuator in accordance with the detected results of the input level detection section and the output level detection section, and the second voltage provided from the processor.

12. The up converter as claimed in claim 11, wherein the automatic gain controller includes a first comparator for comparing an input voltage which is outputted from the input level detection section and inputted to a first terminal of the first comparator with a predetermined reference voltage which is inputted to a second terminal of the first comparator; a second comparator comparing an output voltage which is outputted from the second level detection section and inputted to a first terminal of the second comparator with a control voltage which is outputted from the processor and inputted to a second terminal of the second comparator; and a third comparator for comparing the output signal of the first comparator which is inputted to a first terminal of the third comparator with the output signal of the second comparator which is inputted to a second terminal of the third comparator.

13. The up converter as claimed in claim 12, wherein the third comparator further includes an integrator for integrating the output signal of the third comparator.

14. The up converter as claimed in claim 12, wherein the first comparator compares an output voltage outputted from the input level detection section with the predetermined reference voltage.

15. The up converter as claimed in claim 12, wherein the second comparator compares the control voltage of the second variable attenuator with the output voltage of the output level detection section.

16. The up converter as claimed in claim 12, wherein the third comparator compares the output signals of the first comparator and the second comparator and judges whether the output variation is caused by input variation, or variation of characteristics and temperature of the up converter's elements and communication circumstances.

17. The up converter as claimed in claim 16, wherein third comparator maintains the control voltage of the first variable attenuator without adjustment, if the variation of the input and output signal levels are equivalent to each other, while the third comparator controls the control voltage of the first variable attenuator as much as the difference of the two variation, if the output variation is more higher or lower than to the input variation.

18. Method of controlling output signal of an up converter of a base station transmitter in a wireless communication system, the method comprising:
   a1) detecting an input signal of the up converter;
   b1) converting a frequency of the input signal of the up converter and first attenuating the converted input signal in accordance with a first control voltage;
   c1) converting a frequency of the first attenuated signal and second attenuating the second converted signal in accordance with a second control voltage;
   d1) detecting an output signal of the up converter; and
   e1) outputting the first control signal to adjust the output of the up converter in accordance with both the detected results and the second control voltage.

19. The method of controlling output signal of an up converter as claimed in claim 18, wherein the e1) step including:
   a2) comparing an input voltage of the up converter with the predetermined reference voltage which is stored in the automatic gain controller;
   b2) comparing the second control voltage with the output voltage of the up converter; and
   c2) comparing the output signals obtained from the a2) and b2 steps and judging whether the output variation is caused by input variation, or variation of characteristics and temperature of the up converter's elements and communication circumstances.

20. The method of controlling output signal of an up converter as claimed in claim 19, wherein the c2) step includes step of maintaining the first control voltage without adjustment, if the variation of the input and output signal levels are equivalent to each other, or controlling the first control voltage as much as the difference of the two variation, if the output variation is more higher or lower than to the input variation.

21. An up converter of a transmitter, comprising:
   an input level detector that detects an input signal of the up converter to generate a first detected signal;
   a variable attenuator that attenuates a frequency converted output of the up converter;
   an output level detector that detects the frequency converted output of the up converter to generate a second detected signal; and
   a controller that controls the variable attenuator in accordance with the first and second detected signals, wherein
   the controller comprises:
      a first comparator that compares the first detected signal to a first reference signal to generate a first comparison signal;
      a second comparator that compares the second detected signal to a second reference signal to generate a second comparison signal; and
      a third comparator that compares the first and second comparison signals to generate a third comparison signal to control the attenuator.

22. The up converter of claim 21, further comprising:
   an integrator that integrates the third comparison signal to generate a control signal that controls the variable attenuator.

* * * * *